US006058317A

United States Patent [19]

Posti

[11] Patent Number: 6,058,317

[45] Date of Patent: May 2, 2000

[54] BASE STATION HAVING AT LEAST TWO RADIO SET UNITS LOCATED AT A DISTANCE FROM A CENTRAL PROCESSING UNIT AND A METHOD OF USING THE SAME

[75] Inventor: Harri Posti, Oulu, Finland

[73] Assignee: Nokia Telecommunications Oy, Espoo, Finland

[21] Appl. No.: 08/895,000

[22] PCT Filed: Feb. 26, 1996

[86] PCT No.: PCT/FI96/00112

§ 371 Date: Dec. 22, 1997

§ 102(e) Date: Dec. 22, 1997

[87] PCT Pub. No.: WO96/27269

PCT Pub. Date: Sep. 6, 1996

[30] Foreign Application Priority Data

Feb. 28, 1995 [FI] Finland .................................... 950916

[51] Int. Cl.$^7$ ...................................................... H04Q 7/155

[52] U.S. Cl. ........................... 455/561; 455/560; 455/524

[58] Field of Search .................................... 455/561, 562, 455/560, 525, 524, 507

[56] References Cited

U.S. PATENT DOCUMENTS

| | | | |
|---|---|---|---|
| 4,694,484 | 9/1987 | Atkinson et al. | 379/59 |
| 5,084,869 | 1/1992 | Russell | 370/85.7 |
| 5,121,391 | 6/1992 | Paneth et al. | 370/95.1 |
| 5,752,161 | 5/1998 | Jantti et al. | 455/561 |

FOREIGN PATENT DOCUMENTS

| | | |
|---|---|---|
| 0 166 885 | 1/1986 | European Pat. Off. . |
| 0 439 926 | 8/1991 | European Pat. Off. . |
| 0 439 936 | 8/1991 | European Pat. Off. . |
| 0 600 681 | 6/1994 | European Pat. Off. . |
| 93/20625 | 10/1993 | WIPO . |

*Primary Examiner*—Edward F. Urban
*Assistant Examiner*—Tilahun Gesesse
*Attorney, Agent, or Firm*—IP Group Of Pillsbury Madison & Sutro LLP

[57] ABSTRACT

The present invention relates to a base station of a radio system. The base station has means for establishing a telecommunication connection to radio units in a coverage area of the base station. In order to utilize a capacity of the base station efficiently, the base station comprises a central processing unit with at least one baseband frame unit for supplying baseband signals via switching means, alternatively, to one of at least two radio channel units, and at least two radio set units arranged separately from one another of which at least one of the radio set units is arranged at a distance from the central processing unit. The radio set units are arranged into different radio set units for transferring baseband signals to be transmitted from the frame unit to a radio channel and for forwarding radio frequency signals via an antenna means of the radio set unit.

8 Claims, 1 Drawing Sheet

BASE STATION HAVING AT LEAST TWO RADIO SET UNITS LOCATED AT A DISTANCE FROM A CENTRAL PROCESSING UNIT AND A METHOD OF USING THE SAME

This application is the national phase of international application PCT/FI96/00112, filed Feb. 26, 1996 which was designated the U.S.

BACKGROUND OF THE INVENTION

1. Field of the Invention

The present invention relates to a base station of a radio system comprising: a central processing unit which includes control and maintenance means for controlling the base station in response to control signals transmitted from a base station controller, and at least one baseband frame unit for generating and supplying baseband signals further via a switching means alternatively to either of at least two radio channel units of the base station in response to telecommunication signals transmitted from the base station controller and for processing baseband signals transmitted from said radio channel unit and for supplying them further to the base station controller, and means for establishing a telecommunication connection with radio signals to radio units in the radio coverage area of the base station.

This invention primarily relates to variations in the capacity need of different parts of the geographical area covered by the cellular radio system. For example, in business centres considerably more traffic capacity is needed during daytime than in the evening. Correspondingly, the situation in suburban areas may be such that during daytime the capacity need is very small but in the evenings it becomes great when the residents return home from their places of work. If the capacity of the cellular radio system is dimensioned under these circumstances in accordance with the capacity need peaks, it will lead to a situation in which a considerable portion of the capacity of the system remains unused for the most part of the day.

2. Description of Related Art

Solutions are known previously in which calls of an adjacent cell are transmitted by using an antenna which can be temporarily directed thereto. In that case the coverage area of the adjacent cell cannot usually be completely covered.

Solutions are also known previously in which separate additional channel units are used by means of a relay-type of switchings, that is, the capacity of the additional channel unit shifts from one sector or cell to another in such a way that its antenna connection is changed by means of relay switchings. In this case, the geographical area on which capacity variation can be attained is very small as the RF signal from the antenna connection of the additional channel unit cannot be transferred very far e.g. by means of cables without the signal attenuation being significant in the cable. That means that for practical reasons, the alternative transmission antennas to which the additional channel unit can be switched should situate very close to one another.

SUMMARY OF THE INVENTION

The object of this invention is to solve the above problem and provide a base station of a radio system in which the available traffic capacity can be transferred between different geographical areas in a simple and uncomplicated way and in which the transfer distances may be significantly longer than in prior art solutions. This object is achieved with the base station of the radio system according to the invention that is characterized in that the base station comprises at least two radio set units arranged separately from one another of which at least one is arranged at a distance from the central processing unit, whereby said at least two radio channel units are arranged into different radio set units for transferring baseband signals transmitted from the frame unit to a predetermined radio channel and for forwarding radio frequency signals via antenna means of the radio set unit, and for transferring radio frequency signals received with the antenna means to the baseband and for supplying the baseband signals to the frame unit.

The invention is based on the idea that when at least two radio set units, arranged at a distance from one another and including radio units and antenna means, are connected to a base station, the traffic capacity of the base station can be distributed to a larger area than before because the frame unit in the central processing unit can be alternatively switched to either of the radio set units separately situated from one another based on momentary capacity needs. Because the signals supplied by the central processing unit are not transferred to the radio frequency until at the radio set units, the transfer distances of the RF signals and the losses caused by their transfer can be minimized. Since the total equipment costs of the central processing unit and the separate radio set units, according to the invention, are significantly lower than the total equipment costs of two separate previously known base stations, significant economic advantages are attained with the solution according to the invention in comparison with previous solutions. The most significant advantages of the base station according to the invention are therefore that the capacity of the base station can be efficiently utilized all day as the capacity can be transferred where it is needed, that the areas between which the capacity can be transferred can be situated significantly farther from one another than in known solutions, and that the equipment costs will be significantly lower.

BRIEF DESCRIPTION OF THE DRAWING

The invention is explained with reference to the following drawing in which.

DETAILED DESCRIPTION OF PREFERRED EMBODIMENT

Figure 1:
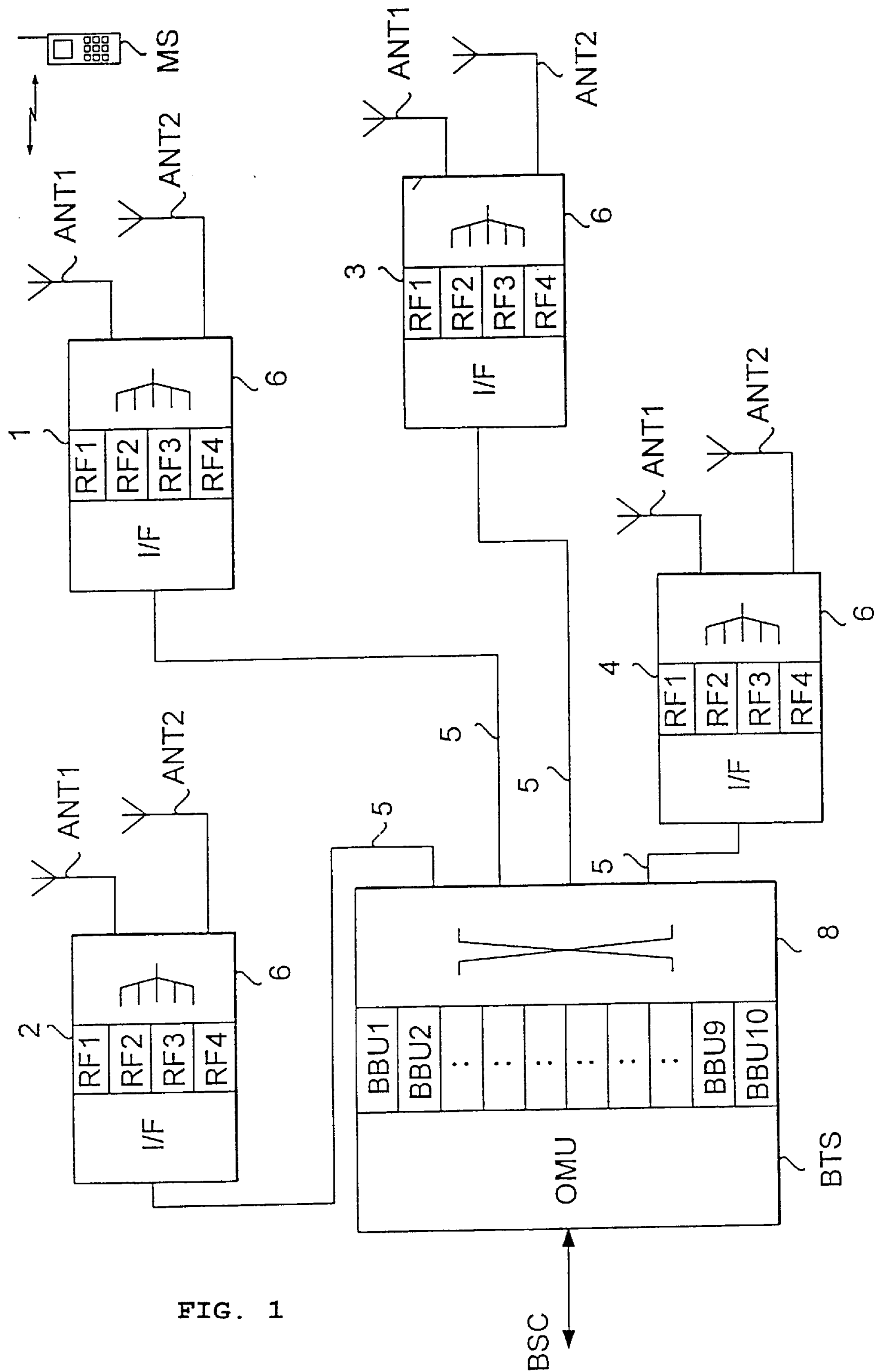
FIG. 1 illustrates a block diagram of a base station according to the invention.

The preferred embodiments of the base station according to the invention are apparent from the appended dependent claims 2 to 7. In the following, the invention will be explained in more detail by means of one preferred embodiment with reference to the accompanying figure illustrating a block diagram of the base station according to the invention.

The base station shown in the figure can be a base station of the GSM system, for example. The structure and operation of the GSM system is explained e.g. in *The GSM System for Mobile Communications*, by M. Mouly & M. Pautet, Palaiseau, France, 1992, ISBN:2-9507190-0-0-7, wherefore it will not be described more closely in this context.

The base station in the figure differs from known base stations in that the equipment of the base station is decentralized to a large geographical area. Therefore there is only a central processing unit of a base station BTS at the actual site of the base station to which radio set units 1 to 4 are connected via data transmission channels 5. One or more radio set units are advantageously integrated (not shown in the figure) into the central processing unit of the base station BTS or placed in its immediate vicinity.

The central processing unit of the base station BTS comprises an operating and maintenance unit OMU that attends to the communication between the base station and the base station controller BSC and controls the operation of the base station. The central processing unit BTS also comprises several baseband frame units BBU1 to BBU10 (Base Band Unit) which generate baseband modulation signals for radio set units 1 to 4, and which process the signals received and transmitted to the baseband by the radio set units 1 to 4 for forwarding them to the base station controller BSC. Subscriber data and control data transmitted in frame units BBU1 to BBU10 are channel coded, interleaved and placed into TDMA frames (Time Division Multiple Access) after which they are supplied to the radio units situated in the radio set units in which they are modulated into a TDMA burst to a desired transmission baseband, that is, a radio channel.

Correspondingly, the frame units BBU1 to BBU10 perform signal detection, frame release, interleaving release and channel decoding.

Frame units BBU1 to BBU10 are switched via a switching matrix 8 to the radio set units 1 to 4. The switching matrix 8 can switch any frame unit BBU1 to BBU10 in part (that is, specified time slots) or in whole to any radio set unit 1 to 4. The selected switching depends on the capacity need required in the coverage area of each radio set unit 1 to 4.

Data channels 5 in the figure may comprise an optical fiber, a copper cable or a micro wave link depending on the transfer distance and the capacity need. The transfer distance is restricted by the propagation delay allowed by the radio system which delay involves e.g. the time spent for transmitting data on the data channel 5. For example, the propagation delay allowed by the GSM system corresponds to a transfer distance of about 35 km on the radio path.

The radio set units 1 to 4 comprise an interface unit I/F that attends to the communication between the radio set unit and the central processing unit BTS. The radio set units 1 to 4 also comprise radio channel units RF1 to RF4 that receive baseband signals transmitted from the data channel 5, transfer the signals to predetermined radio channels and forward the radio frequency signals via a combiner device 6 and an antenna ANT1. Similarly, the radio channel units RF1 to RF4 receive radio frequency signals from the reception antenna ANT2 and the combiner device 6 and transfer them to the baseband before they are transmitted via the interface unit I/F to a specified baseband unit BBU1 to BBU10 in the central processing unit BTS.

Frequency hopping can be applied in two alternative ways in the base station shown in the figure. The first possible way is that the radio channel units RF1 to RF4 in each radio set unit 1 to 4 are permanently tuned into different radio channels of their own, whereby frequency hopping will be accomplished in such a way that different time slots of a specified logical channel are transmitted alternately with different radio channel units RF1 to RF4 in accordance with a predetermined frequency hopping sequence. This may be achieved in such a way that the switching matrix 8 is arranged to switch the specified frame unit BBU1 to BBU10 alternately to different radio channel units RF1 to RF4 of the same radio set unit 1 to 4 always before transmitting a new burst, for example, whereby the radio channel of the logical channel maintained by the frame unit will also change.

Another possible way to accomplish frequency hopping is that a specified frame unit BBU1 to BBU10 constantly supplies signals to the same radio channel unit RF1 to RF4, whereby the radio channel of the radio channel unit is always changed before transmitting a new burst, for example.

In the case shown in the figure, the coverage areas of the radio set units RF1 to RF4 are regarded as independent radio cells. Therefore one time slot of one radio channel unit is reserved from each radio set unit for sending a BCCH channel required by the GSM system. The different radio set units thus employ different frequency channels for sending the BCCH channel.

However, if the radio set units are situated at a sufficient distance from one another so that they will not disturb one another, the radio set units can send the BCCH channel on the same frequency channel. The same frequency channel can be used for sending the BCCH channel also if the topography is suitable or when the radio set units are situated in different parts of the same building, whereby they will not disturb one another. One alternative for sending the BCCH channel is that two radio set. units, in both of which synthesizer frequency hopping is utilized, are arranged to employ the same BCCH frequency channel so that the first radio set unit uses the BCCH frequency channel only during one time slot, that is, specifically for sending the BCCH channel. On the other hand, the second radio equipment utilizes all available time slots on the BCCH channel so that it uses one time slot for transmitting the BCCH channel and on others it transmits traffic channels, for example.

It is to be understood that the above specification and the figures related thereto are only intended to illustrate the present invention. The different variations and modifications of the invention will be evident to those skilled in the art without deviating from the scope and spirit of the invention presented in the appended claims.

I claim:

1. A base station of a radio system comprising:

a central processing unit which includes:

control and maintenance means for controlling the base station in response to control signals transmitted from a base station controller, and at least one baseband frame unit (BBU1–BBU10) for generating and supplying baseband signals further via switching means alternatively to one of at least two radio channel units of the base station in response to telecommunication signals transmitted from the base station controller and for processing baseband signals transmitted from the one of the at least two radio channel units and for supplying the baseband signals further to the base station controller;

means for establishing a telecommunication connection with radio signals to radio units (MS) in a radio coverage area of the base station; and at least two radio set units arranged separately from one another, at least one of the at least two radio set units being arranged at a distance from the central processing unit, wherein:

the at least two radio channel units are arranged into different ones of the at least two radio set units for transferring the baseband signals transmitted from the at least one baseband frame unit to a predetermined radio channel and for forwarding radio frequency signals via antenna means of a respective one of the at least two radio set units, and for transferring radio frequency signals received with the antenna means to a baseband and for supplying the baseband signals to the at least one baseband frame unit.

2. A base station according to claim 1, wherein:

at least one of the at least two radio set units has a data transmission connection with the central processing unit on a data channel comprised of one of an optical fiber, a copper wire and a micro wave link, and the central processing unit and the at least one of the at least two radio set units comprise signal shaping means for shaping telecommunication signals transmitted between the central processing unit and the at least one of the at least two radio set units into a form suitable for transmission on the data channel.

3. A base station according to claim 1, wherein:

at least one of the at least two radio set units comprises a plurality of the at least two radio channel units tuned into different radio channels, and a specified one of the at least one baseband frame unit is arranged to supply, via the switching means, the baseband signals associated with a same logical channel to different ones of the radio channel units of a same one of the at least one of the at least two radio set units in accordance with a frequency hopping sequence designated by the base station controller.

4. A base station according to claim 1, wherein:

a specified one of the at least one baseband frame unit is arranged to supply the baseband signals associated with a same logical channel repeatedly to a same one of the at least two radio channel units of one of the at least two radio set units, and that the same one of the at least two radio channel units comprises means for changing a radio channel to be used in accordance with a frequency hopping sequence designated by the base station controller.

5. A base station according to claim 1, wherein:

the base station is a base station of a time division cellular radio system, and a same one of the at least one baseband frame unit is arranged to supply the baseband signals to be transmitted in different time slots via the switching means to the at least two radio channel units situated in different ones of the at least two radio set units.

6. A base station according to claim 1, wherein the base station is a base station of a GSM system.

7. A base station according to claim 1, wherein the distance between at least one of the at least two radio set units and the central processing unit is at least two kilometers.

8. A method of communicating via a base station, comprising:

arranging at least two radio set units separately from one another, at least one of the at least two radio set units being arranged at a distance from a central processing unit of the base station;

arranging at least two radio channel units into different ones of the at least two radio set units;

controlling the base station, via control and maintenance means of the central processing unit, in response to control signals transmitted from a base station controller;

generating and supplying baseband signals, from at least one baseband frame unit of the central processing unit, via switching means, alternatively, to one of the at least two radio channel units of the base station in response to telecommunications signals transmitted from the base station controller;

processing baseband signals transmitted from the one of the at least two radio channel units and supplying the baseband signals to the base station controller;

establishing a telecommunications connection with radio signals to radio units in a radio coverage area of the base station;

transferring the baseband signals from the at least one baseband frame unit to a predetermined radio channel and forwarding radio frequency signals, corresponding to the baseband signals, via an antenna of a respective one of the at least two radio set units; and transferring radio frequency signals received with the antenna to a baseband, and supplying the baseband signals to the at least one baseband frame unit.

* * * * *